(12) United States Patent
Poerschke et al.

(10) Patent No.: US 10,678,327 B2
(45) Date of Patent: Jun. 9, 2020

(54) SPLIT CONTROL FOCUS DURING A SUSTAINED USER INTERACTION

(71) Applicant: MICROSOFT TECHNOLOGY LICENSING, LLC, Redmond, WA (US)

(72) Inventors: Robert Poerschke, Redmond, WA (US); Jonathan Hoof, Kenmore, WA (US); Tommaso Checchi, Stockholm (SE); Henry C. Sterchi, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 15/418,038

(22) Filed: Jan. 27, 2017

(65) Prior Publication Data

US 2018/0028917 A1    Feb. 1, 2018

Related U.S. Application Data

(60) Provisional application No. 62/369,293, filed on Aug. 1, 2016.

(51) Int. Cl.
*A63F 13/25* (2014.01)
*G06F 3/01* (2006.01)
(Continued)

(52) U.S. Cl.
CPC .............. *G06F 3/013* (2013.01); *A63F 13/25* (2014.09); *A63F 13/5255* (2014.09);
(Continued)

(58) Field of Classification Search
CPC ...... G06F 3/013; G06F 3/04812; A63F 13/57; A63F 13/213
(Continued)

(56) References Cited

U.S. PATENT DOCUMENTS

| 6,157,367 A | 12/2000 | Van Der Haar et al. |
| 6,204,828 B1 * | 3/2001 | Amir ........................ G06F 3/013 345/156 |

(Continued)

OTHER PUBLICATIONS

Vickers, et al., "Keeping an eye on the game: eye gaze interaction with Massively Multiplayer Online Games and virtual communities for motor impaired users", In Proceedings of the 7th international conference on disability, virtual reality and associated technologies with ArtAbilitation, Sep. 8, 2008, pp. 159-166.

(Continued)

*Primary Examiner* — Omkar A Deodhar
*Assistant Examiner* — Shauna-Kay Hall
(74) *Attorney, Agent, or Firm* — Alleman Hall Creasman & Tuttle LLP

(57) ABSTRACT

The technology described herein splits the control focus of a user interface during a sustained user interaction. A sustained user interaction is an interaction action lasting more than a threshold period of time. The sustained interaction is initiated when the user directs the control focus of an interface onto an interface object and begins an interaction with the object. Upon determining that a sustained interaction has begun, a control focus lock is executed at the point of control focus where the sustained interaction began, for example, the point where the cursor was located when the sustained interaction began. Upon termination of the sustained interaction, the primary control focus is snapped to the location of the secondary control focus and a secondary control focus is terminated until a subsequent sustained interaction is detected.

20 Claims, 11 Drawing Sheets

(51) Int. Cl.
*A63F 13/5372* (2014.01)
*A63F 13/5255* (2014.01)
*G06F 3/0484* (2013.01)
*A63F 13/837* (2014.01)

(52) U.S. Cl.
CPC ........ *A63F 13/5372* (2014.09); *A63F 13/837* (2014.09); *G06F 3/011* (2013.01); *G06F 3/04842* (2013.01); *G06F 2203/0381* (2013.01)

(58) Field of Classification Search
USPC .......................................................... 463/31
See application file for complete search history.

(56) References Cited

U.S. PATENT DOCUMENTS

| | | | |
|---|---|---|---|
| 8,176,442 B2 | 5/2012 | Poot | |
| 9,013,264 B2 | 4/2015 | Parshionikar et al. | |
| 9,201,578 B2 | 12/2015 | Scott et al. | |
| 10,025,381 B2* | 7/2018 | Cederlund | G06F 3/014 |
| 10,220,303 B1* | 3/2019 | Schmidt | A63F 13/04 |
| 2001/0035845 A1 | 11/2001 | Zwern | |
| 2005/0255912 A1* | 11/2005 | Love | G06F 3/1423 |
| | | | 463/30 |
| 2007/0125633 A1* | 6/2007 | Boillot | G06F 3/011 |
| | | | 200/52 R |
| 2009/0073117 A1* | 3/2009 | Tsurumi | G06F 3/005 |
| | | | 345/158 |
| 2011/0083112 A1* | 4/2011 | Matsubara | G06F 3/011 |
| | | | 715/863 |
| 2012/0244935 A1* | 9/2012 | Burckart | A63F 13/5255 |
| | | | 463/30 |
| 2012/0257035 A1* | 10/2012 | Larsen | G06F 3/013 |
| | | | 348/78 |
| 2012/0272179 A1* | 10/2012 | Stafford | G06F 3/012 |
| | | | 715/781 |
| 2013/0172083 A1* | 7/2013 | Sivak | A63F 13/23 |
| | | | 463/32 |
| 2014/0184550 A1* | 7/2014 | Hennessey | G06F 3/013 |
| | | | 345/173 |
| 2015/0153913 A1 | 6/2015 | Ballard et al. | |
| 2015/0193018 A1 | 7/2015 | Venable et al. | |
| 2015/0355805 A1* | 12/2015 | Chandler | G06F 3/0482 |
| | | | 715/784 |
| 2016/0116980 A1* | 4/2016 | George-Svahn | G06F 3/013 |
| | | | 345/168 |

OTHER PUBLICATIONS

Coote, James, "Gamasutra: It's in the Eyes", Published on: Sep. 8, 2014 Available at: http://www.gamasutra.com/blogs/JamesCoote/20140908/225122/Its_in_the-Eyes.php.

* cited by examiner

SPLIT CONTROL FOCUS DURING A SUSTAINED USER INTERACTION

CROSS-REFERENCE TO RELATED APPLICATIONS

This application claims the benefit of U.S. Provisional Application No. 62/369,293, filed Aug. 1, 2016, entitled "SPLIT CONTROL FOCUS DURING A SUSTAINED USER INTERACTION," the entirety of which is herein incorporated by reference.

BACKGROUND

Augmented reality (AR) and virtual reality (VR) provide an immersive computing experience by allowing a user to interact with computer-generated objects and, in some cases, navigate in a computer-generated world. AR overlays a view of the physical, real-world environment with computer-generated objects that provide information and allows for interactions with the computer-generated objects in the physical, real-world environment. VR provides a simulated environment where a user can interact with computer-generated objects and/or move around in the simulated environment.

Some AR/VR environments can allow a user to control a cursor using gaze detection. Gaze detection tracks the movement of the user's eye(s) or head as a control input. Essentially, gaze detection seeks to move a control focus (such as a cursor) to a point where the user is looking.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein splits the control focus of a user interface during a sustained user interaction. A sustained user interaction is an interaction lasting more than a threshold period of time. The threshold period of time could be 100 ms, one second, two seconds, five seconds, ten seconds, or more. The sustained interaction is initiated when the user directs the control focus of an interface onto an interface object and begins an interaction with the object. The interaction can be initiated by selecting a key on a keyboard, a control on a gamepad, touching a touchscreen, or through some other method. The interaction is determined to be a sustained interaction when criteria for a sustained interaction with the object is satisfied by the user input. Different objects can have different sustained interaction criteria. The sustained interaction is terminated when termination criteria is satisfied. Again, different objects can have different termination criteria.

Upon determining that a sustained interaction has begun, a control focus lock is executed at the point of control focus where the sustained interaction began. For example, the point where the cursor was located when the sustained interaction began. The control focus lock maintains a location of the control focus at the initial point of control focus despite receiving additional movement input. A secondary control focus indication, such as a cursor, is displayed and made controllable by the user while the sustained interaction continues without interruption by the user's subsequent movements of the secondary control focus. The secondary control focus may be controlled by gaze detection or some other mechanism. Upon termination of the sustained interaction, the primary control focus is snapped to the location of the secondary control focus and the secondary control focus is terminated until a subsequent sustained interaction is detected.

The control focus is often visibly indicated by a cursor. A cursor can take many forms (e.g., arrow, plus, reticle, line) and provides a visible indication of movement in response to a user's control input. The control input mechanism can take many forms, such as a mouse, keyboard, joystick, touchscreen, or gamepad. The control input can also be through a natural user interface, such as provided by gaze detection or gesture detection. Gaze detection determines where on a screen a user is looking by monitoring eye or head movement. Gesture detection can determine body or body part movement that is consistent with a control input.

BRIEF DESCRIPTION OF THE DRAWINGS

The present invention is described in detail below with reference to the attached drawing figures, wherein.

DETAILED DESCRIPTION

Figure 1:
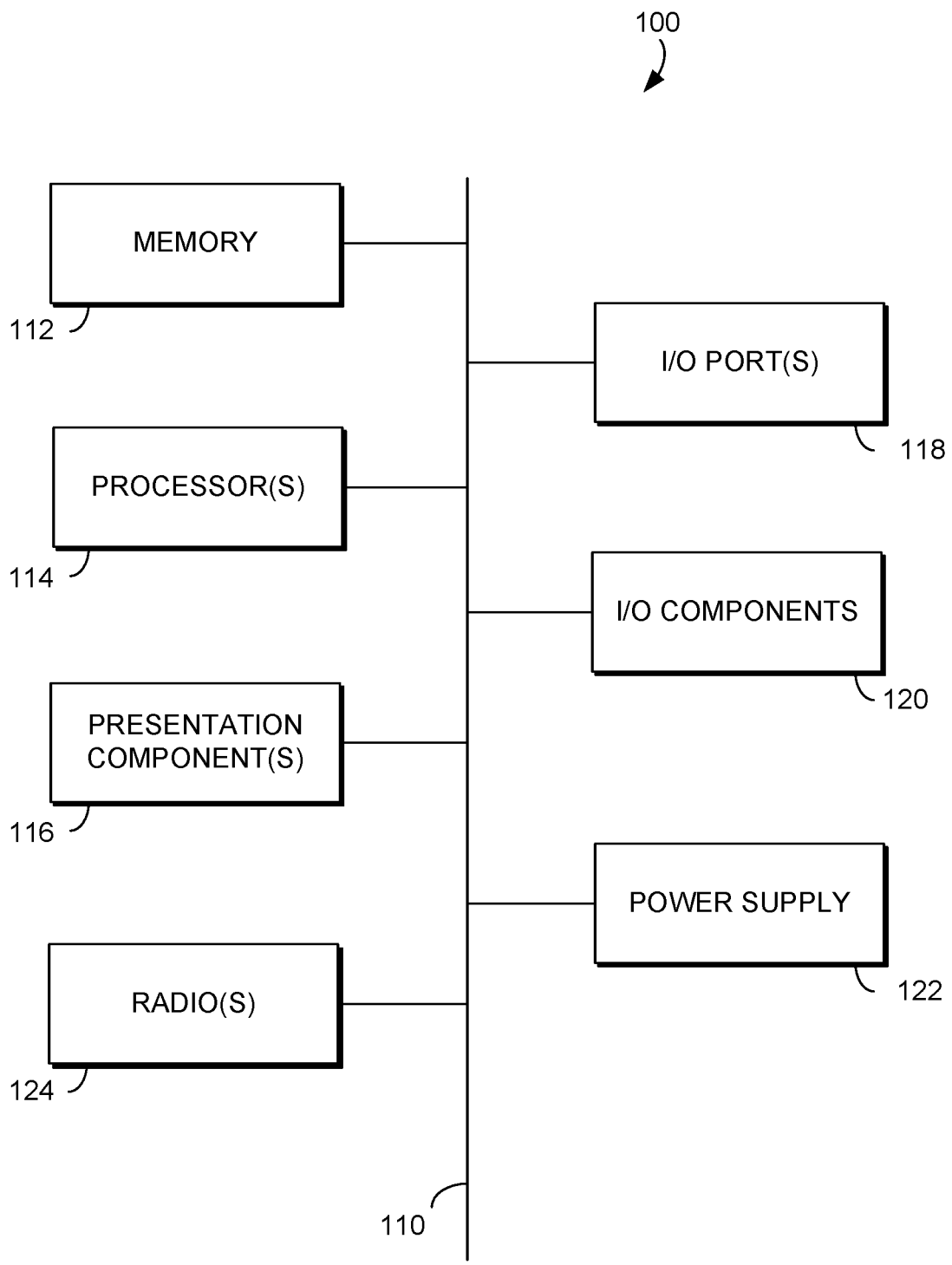
FIG. 1 is a schematic showing an exemplary computing environment suitable for use with the technology described herein.

The technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

The technology described herein splits the control focus of a user interface during a sustained user interaction. A sustained user interaction is an interaction lasting more than a threshold period of time. The threshold period of time could be 100 ms, one second, two seconds, five seconds, ten seconds, or more. The threshold amount of time can be customized on an application-by-application basis as well as action-by-action basis within an application. The sustained interaction is initiated when the user directs the control focus of an interface onto an interface object and begins an interaction with the object. The interaction can be initiated by selecting a key on a keyboard, making a gesture, a control on a gamepad, touching a touchscreen, or through some other method. The interaction is determined to be a sustained interaction when criteria for a sustained interaction with the object is satisfied. Different objects can have different sustained interaction criteria. The sustained interaction is terminated when termination criteria is satisfied. Again, different objects can have different termination criteria.

Upon determining that a sustained interaction has begun, a control focus lock is executed at the point of control focus where the sustained interaction began. For example, the point where the cursor was located when the sustained interaction began. The control focus lock maintains a location of the control focus at the initial point of control focus despite receiving additional movement input. A secondary control focus indication, such as a cursor, is displayed and made controllable by the user while the sustained interaction continues without interruption by the user's subsequent movements of the secondary control focus. The secondary control focus may be controlled by gaze detection or some other mechanism. Upon termination of the sustained interaction, the primary control focus is snapped to the location of the secondary control focus and the secondary control focus is terminated until a subsequent sustained interaction is detected.

The control focus is often visibly indicated by a cursor. A cursor can take many forms (e.g., arrow, plus, reticle, line) and provides a visible indication of movement in response to a user's control input. The control input mechanism can take many forms, such as a mouse, keyboard, joystick, touchscreen, or gamepad. The control input can also be through a natural user interface, such as provided by gaze detection or gesture detection. Gaze detection determines where on a screen a user is looking by monitoring eye or head movement. Gesture detection can determine body or body part movement that is consistent with a control input.

The technology described herein can have particular applicability to a video game environment. Many video games require sustained user interactions with game objects. For example, a user may need to navigate a character nearby a game object and engage the object for a sustained period of time to destroy the object, move a pulley, push a lever, open a door, or accomplish some other task. Engaging the object may require the control focus, as indicated by a cursor, or some other visible indication, to be on the object and for a second control input to be provided for a sustained period. The second control input could be the user activating a control on a gamepad or other input device and maintaining activation of the control for a threshold period of time. Maintaining activation of the control can require the user to hold down a control or repeatedly push the control. For example, a user may need to push and hold the "A" button on a gamepad for five seconds to break a block.

Games may specify criteria for sustained actions. Different games can have different sustained action criteria, and within a game, different objects can have different sustained action criteria. Taking the block breaking example from above, the sustained action criteria may require the user to: 1) engage the object with the control focus; 2) while a user's character is a threshold distance from the object, activate a game control associated with an action that can be taken on the object; and 3) maintain activation of the game control for a threshold period of time.

Upon detection that the sustained action criteria is satisfied, the cursor can be locked on the game object while the action continues automatically until a sustained-action termination criteria is satisfied. At the same time, a secondary cursor can be displayed and additional movement control provided by the user can control the movement of the secondary cursor while the sustained action is ongoing. For example, the block breaking could continue with the original cursor displayed and focused on the block and the secondary cursor is moved around the display in response to new user movement input. As mentioned, the user movement input can be gaze detection.

Upon detection that a sustained-action termination criteria is satisfied, the primary and secondary cursor can be unified at the location of the secondary cursor when the termination criteria was satisfied. This can allow a user to quickly target an additional object as soon as the first sustained action is terminated. The sustained-action termination criteria can include completion of the action. Different actions have different completion scenarios, but in the block breaking scenario, completely breaking the block completes the action. The termination criteria can also include negation of one or more of the initiation criteria. For example, the user could discontinue activation of the input control responsible for the action. In other words, the user can release the "A" button that activated the action in the first place. The user could also navigate away from the object causing the action to cease.

It should be noted that navigation or movement can be differentiated from movement of the control focus or view. Movement of a game character can be controlled by an input, such as a stick on a gamepad. Movement of the game character can include translation of the game character through the game world as well as changing the direction the character is facing. Changing the view can change where the character is looking without changing where the character is moving. In some games, the view control and control focus are the same thing. For example, the control focus can be the center of the character's view. The control focus for the character can be controlled through a different input, such as gaze detection, from the movement control. Gaze detection can be implemented through eye tracking technology or head tracking technology. Eye tracking technology uses a camera to determine where the eyes are looking. Head tracking technology tracks head movement, for example, through use of a head-mounted display. The focus input can determine where the character is looking, while movement input controls where the character is located within a game environment.

The technology described herein can use input data provided by controls (e.g., gamepads, head-mounted displays) without alteration. The technology can be implemented by game code or an application that interfaces with the game code.

Having briefly described an overview of aspects of the technology described herein, an exemplary operating environment in which aspects of the technology described herein may be implemented is described below in order to provide a general context for various aspects of the technology described herein.

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program submodules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program submodules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components include a microphone, joystick, gamepad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Exemplary Online Gaming Environment

Figure 2:
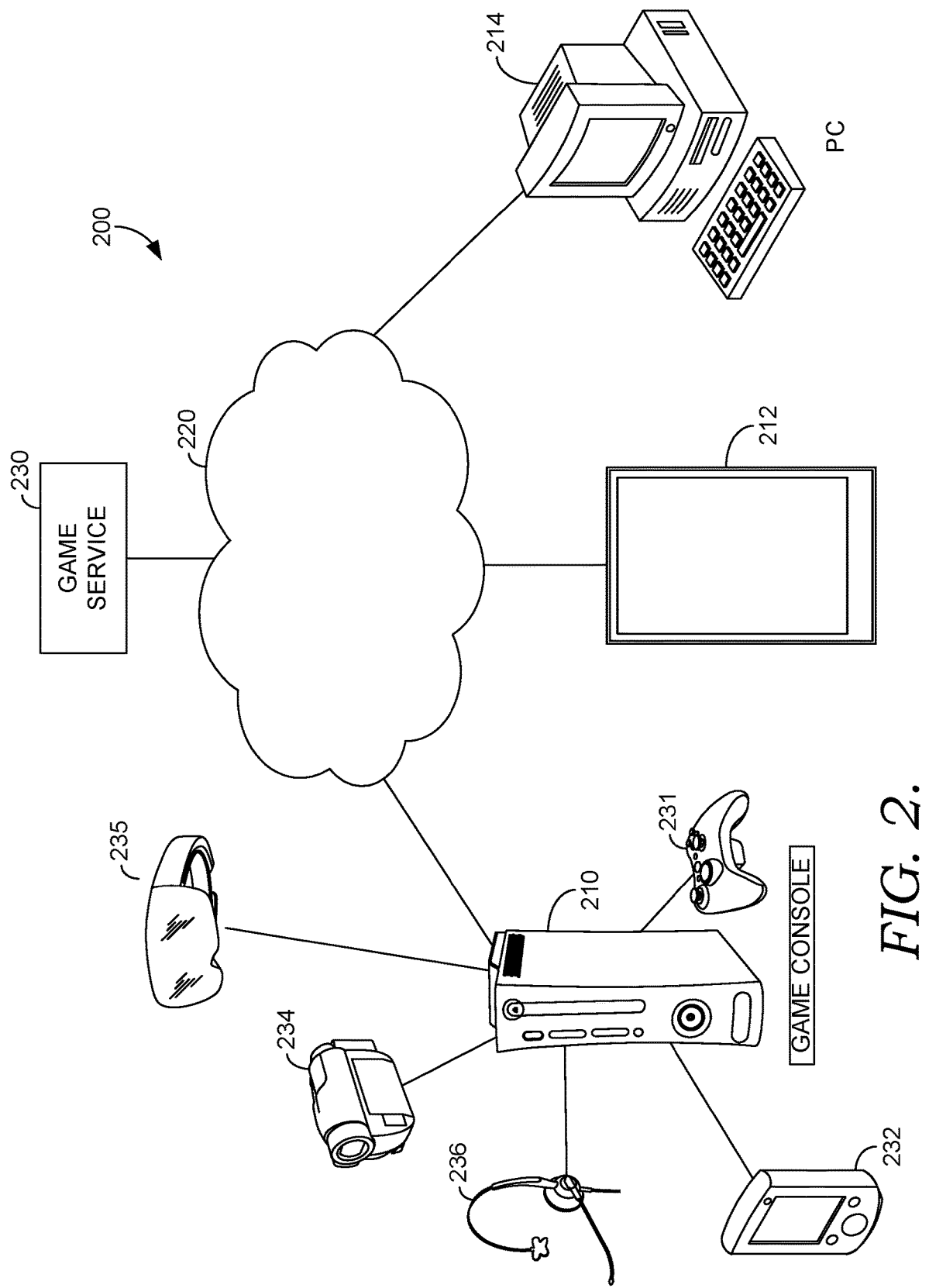
FIG. 2 is an illustration of a gaming environment, in accordance with aspects of the technology described herein.

Turning now to FIG. 2, an online gaming environment 200 is shown, in accordance with an aspect of the present invention. The online gaming environment 200 comprises various game clients connected through a network 220 to a game service 230. Exemplary game clients include a game console 210, a touchscreen device 212, and a personal computer 214. Use of other game clients, such as smartphones, are also possible. The game console 210 may have one or more game controllers communicatively coupled to it. In one aspect, the touchscreen device 212 may act as an input device for a game console 210 or a personal computer 214 using a virtual control interface. Network 220 may be a wide area network, such as the Internet.

The controllers associated with game console 210 include a gamepad 231, a tablet 232, a headset 236, a head-mounted display (HMD) 235, and depth camera 234. A game console may be associated with control devices that generate both a rich input and a basic input. Individual controllers are capable of generating different kinds of inputs and a single controller could generate both a rich input and a basic input.

The gamepad 231 may be capable of generating basic control signals, such as those generated by button selections and joystick movement. Movement data such as that generated by accelerometers and gyros within the gamepad 231 may be examples of rich sensory data. In some implementations, the movement data is not considered a rich sensory data.

Tablet 232 is shown coupled directly to the game console 210, but the connection could be indirect through the Internet or a subnet. In one aspect, the game service 230 helps make a connection between the tablet 232 and touchscreen device 212 and the game console 210. The tablet 232 is capable of generating numerous input streams and may also serve as a display output mechanism. In addition to being a primary display, the tablet 232 could provide supplemental game information related to information shown on a primary display coupled to the game console 210, or simply be a control surface. The input streams generated by the tablet 232 include video and picture data, audio data, movement data, touchscreen data, and keyboard input data.

The head-mounted display (HMD) 235 can take the form of an augmented reality device, a virtual reality device, or some other wearable device that provides visual output to the user. It is contemplated that any other fully or partially immersive perceptual technologies, including or not including an HMD, may be employed in accordance with embodiments described herein. That is, embodiments described herein applied to augmented reality applications have been contemplated to be within the purview of the present disclosure. The HMD 235 can include several components, including sensors (e.g., accelerometer, gyroscope, magnetometer, infrared receiver, GPS radio, light sensor, 3D scanner, CMOS sensor, etc.), a stereoscopic display component, input modules (e.g., microphone, user input buttons), and output modules (e.g., speakers, haptic systems, LEDs), among other things. In some embodiments, the HMD 235 can also include a forward-facing camera (not shown). In various embodiments, the sensors, stereoscopic display component, input and output modules, and/or forward-facing camera can be integrated into the HMD 235.

The headset 236 captures audio input from a player and the player's surroundings and may also act as an output device if it is coupled with a headphone or other speaker.

The depth camera 234 generates a depth cloud used as a control input. The depth camera 234 may use an infrared camera to determine a depth, or distance, from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may comprise multiple computing devices communicatively coupled to each other. In one aspect, the game service 230 is implemented using one or more data centers. The data centers may be spread out across various geographic regions including cities throughout the world. In this scenario, the game clients may connect to the closest data center. Aspects of the present invention are not limited to this setup.

The game service 230 allows the game to be executed within the computing devices provided by the game service 230. A communication session between the game service 230 and game clients carries input traffic to the game service 230 and can return a rendered game image and/or other game output.

Figure 3:
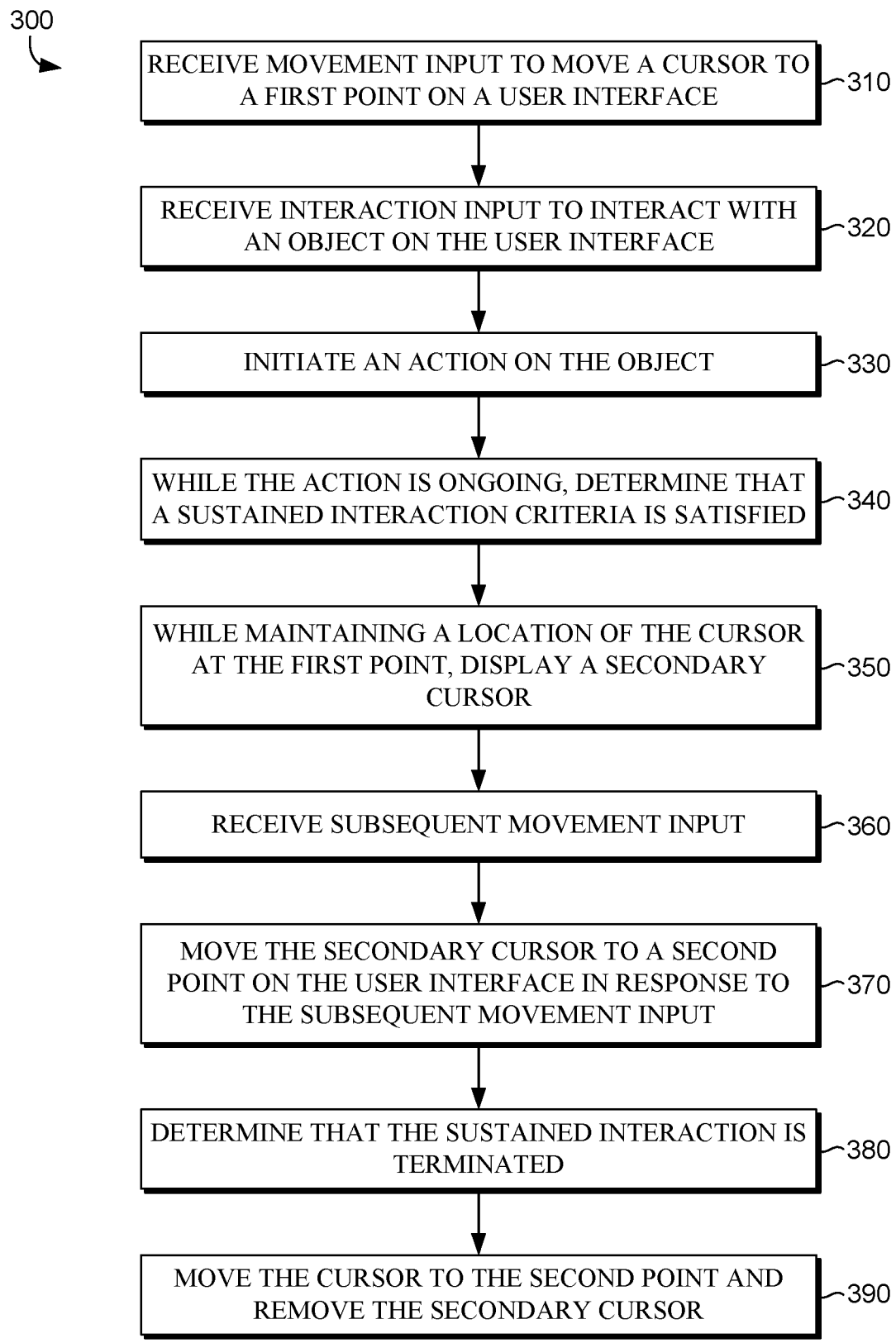
FIG. 3 is a flow chart showing a method of generating a split control focus, in accordance with aspects of the technology described herein.

Turning now to FIG. 3, a flow chart showing a method 300 for generating a split control focus is shown. Method 300 may be performed by a computing device running an application in which a split control focus is implemented.

At step 310, movement input is received to move a cursor to a first point on a user interface. The movement input can be gesture based, use gaze detection, or some other input mechanism.

At step 320, interaction input to interact with an object on the user interface is received. In one aspect, the interaction input is provided by a different input device than provided the movement input. In one aspect, the movement input is provided by gaze detection (either eye tracking or head tracking) and the movement input is provided by a gamepad, keyboard, or mouse.

At step 330, the application initiates an action on the object. The action is initiated because the application state, as controlled by the movement input and interaction input, satisfies a criteria for the action to be initiated.

At step 340, while the action is ongoing, a determination is made that a sustained interaction criteria is satisfied. In one aspect, every action associated with a sustained interaction criteria is evaluated for satisfaction of the criteria upon initiation of the action.

At step 350, while maintaining a location of the cursor at the first point, a secondary cursor is displayed. The secondary cursor may initially be displayed adjacent to the initial cursor. The secondary cursor can have a different appearance than the primary cursor.

At step 360, subsequent movement input is received. At step 370, the secondary cursor is moved to a second point on the user interface in response to the subsequent movement input. The secondary cursor can be moved all around the visible display.

At step 380, the sustained interaction is determined to be terminated, as described previously. At step 390, the cursor is moved to the second point and the secondary cursor is removed. In other words, the two cursors become one cursor upon completion of the sustained interaction.

Figure 4:
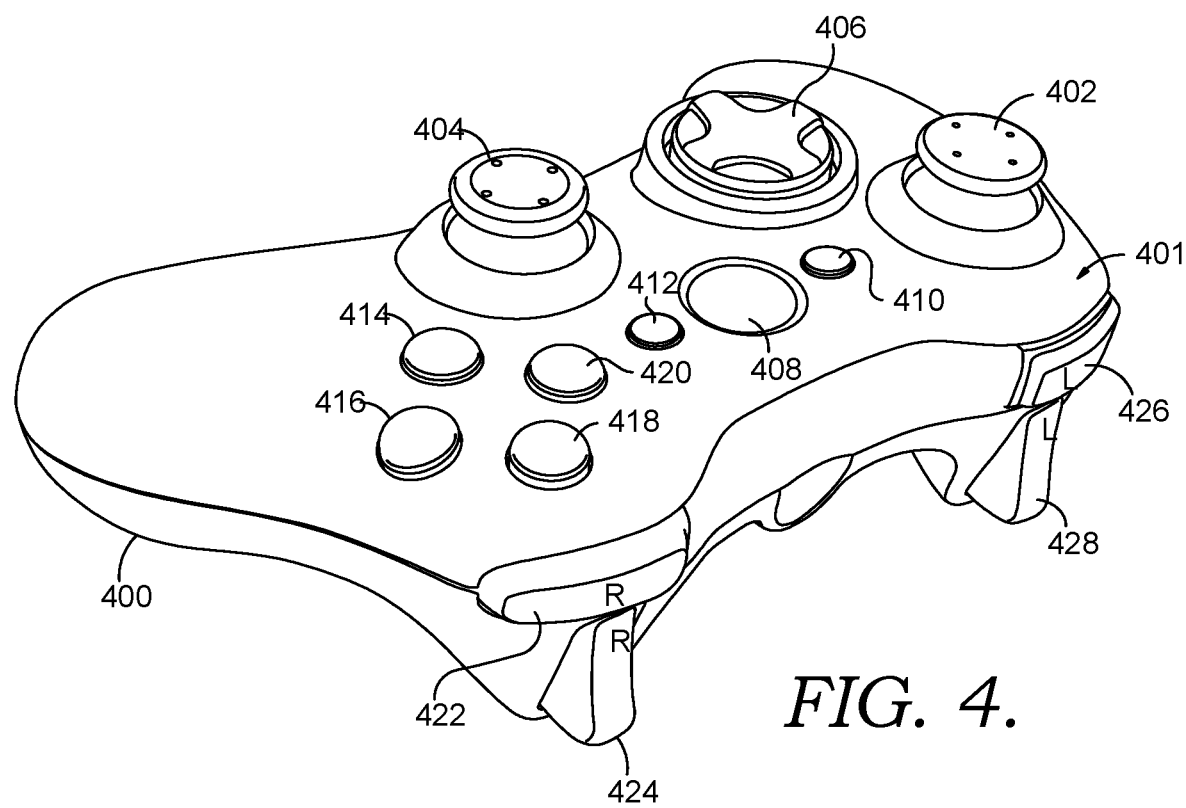
FIG. 4 is an illustration of a gamepad, in accordance with aspects of the technology described herein.
Figure 5:
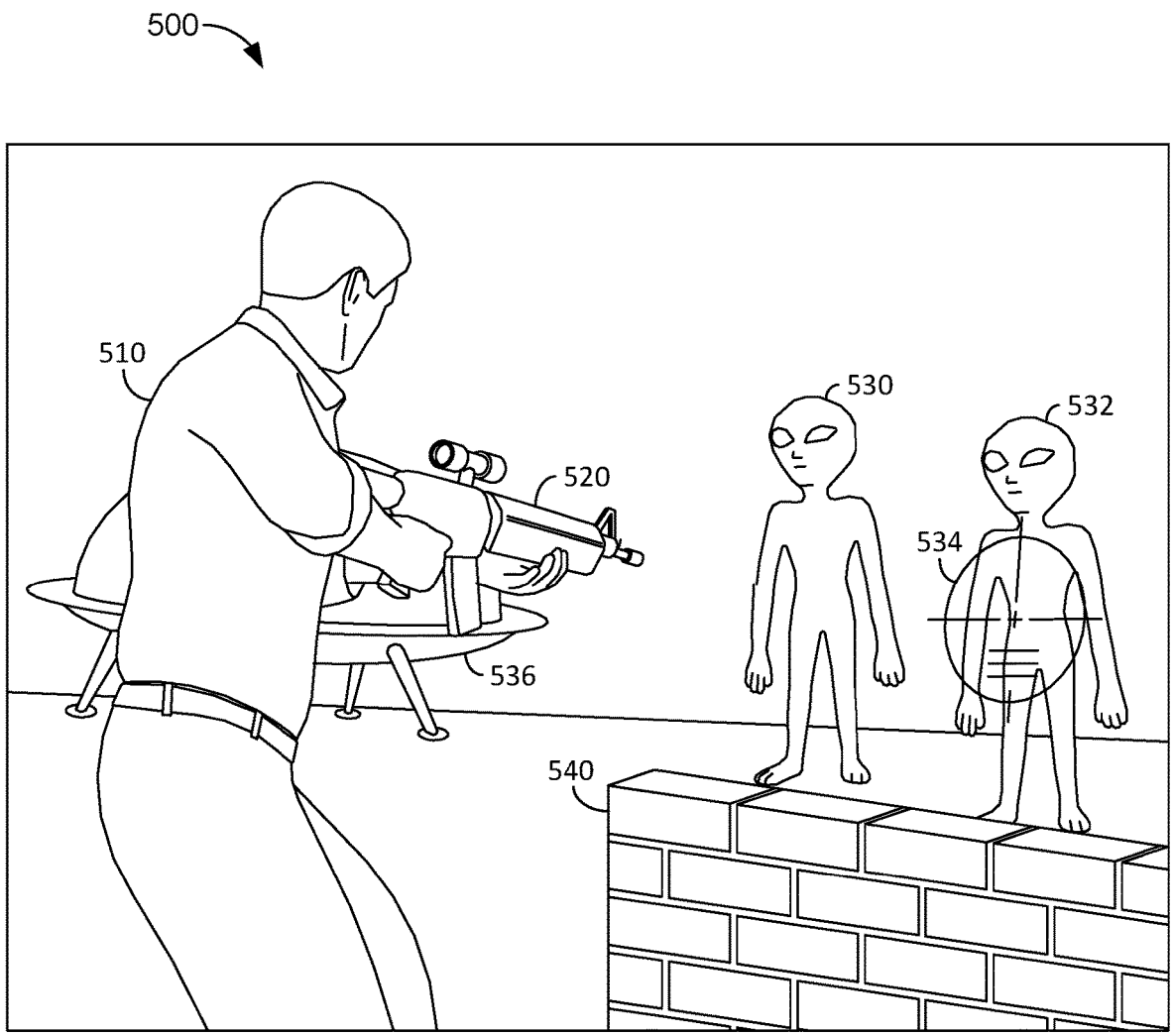
FIGS. 5-8 illustrate a locked control focus scenario, in accordance with aspects of the technology described herein.

Turning now to FIG. 4, a gamepad controls on standard gamepad 400 are shown. As mentioned, the gamepad can be used with gaze detection to initiate a user control. Any control on a gamepad may be described as a gamepad control herein. The gamepad 400 comprises several gamepad controls, including a left stick 402 and a right stick 404. Gamepad controls on the top side 401 of gamepad 400 include a direction pad 406, a guide button 408, a back button 410, a start button 412, and face buttons 414, 416, 418, and 420. Other gamepad controls on the gamepad 400 are a right bumper 422 and a right trigger 424. The gamepad 400 also includes a left bumper 426 and a left trigger 428.

The gamepad 400 is ergonomically designed to be held by both the user's right and left hand. The left hand may control the left stick 402 along with the left bumper 426 and the left trigger 428. A user may prefer to control the left stick 402 with his left thumb, the left bumper 426 with his left index finger, and the left trigger 428 with his left middle finger. The right hand may control the right stick 404 along with the right bumper 422 and the right trigger 424. A user may prefer to control the right stick 404 with his right thumb, the right bumper 422 with his right index, and the right trigger 424 with his right middle finger. The face buttons 414, 416, 418, and 420 may also be controlled by the user's right hand.

The different controls on the gamepad 400 control different features of a game. For example, moving the left stick 402 may translate a player through the game, while the right stick 404 rotates the view. Game developers can establish each button's function in a game. In aspects, one of the sticks is used to control movement of a player, while a virtual reality headset or some other gaze detection technology is used to control the view.

As used herein, the phrase "activating a gamepad control" means interacting with a gamepad control to cause a functional instruction to be communicated from the gamepad 400. For example, pushing a reference button is an example of activating a gamepad control. In response to pushing a reference button, the gamepad generates a functional instruction that is communicated to the gaming device. The gaming device interprets the functional instruction as a push of the reference button. This instruction may be fed to a video game title and the game manipulated according to the consequence of pushing the reference button. Moving a stick is another example of activating a gamepad control. Holding a stick or a button in a particular position or state may cause multiple functional instructions to be generated by the gamepad.

Turning now to FIGS. 5-8, a control focus lock (e.g., cursor lock) illustration within a third-person shooting environment is illustrated, in accordance with an embodiment of the present invention. A third-person shooting environment 500 shows most of the character 510 controlled by the user. In this case, the character 510 is holding a rifle 520 that is pointed at the first alien 532, while the second alien 530 looks on. The spaceship 536 and brick wall 540 are also visible. Movement input is used to control the reticle 534 and move it onto the first alien 532. In one aspect, the movement input is gaze detection, as described previously. In this game, the reticle 534 represents the location of the control focus.

Figure 6:
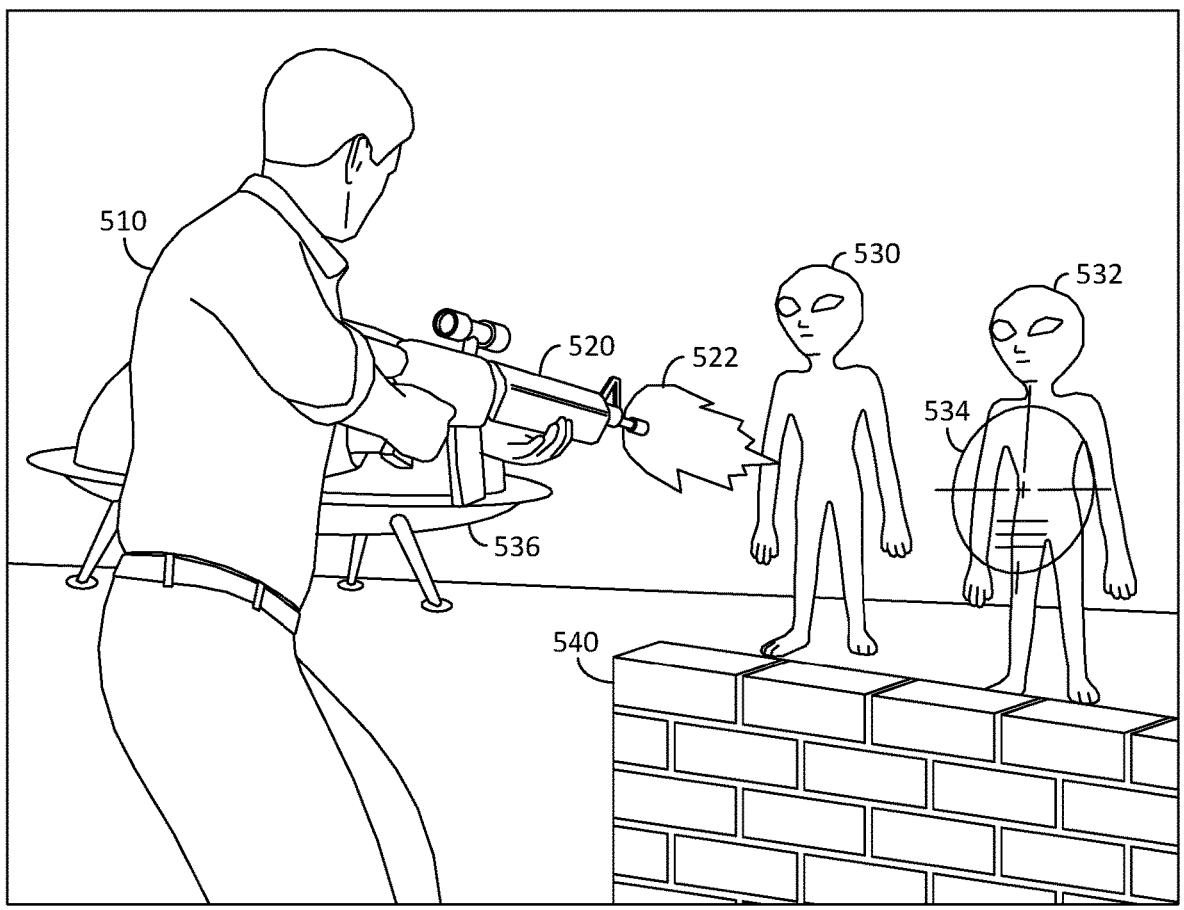

Turning now to FIG. 6, the user begins an interaction with the first alien 532. The first alien 532 is an example of an interface object. In this case, the interaction is the user shooting at the first alien 532. In this game, the first alien 532 has a force field and the user needs to hold sustained fire on the first alien 532 to break through the force field and kill the first alien 532. The muzzle flash 522 indicates the firing action. The user may maintain sustained fire by pushing and holding a button on a gamepad, such as RT. Alternatively, the user may need to repeatedly push an input control. Holding the RT button while engaged with the first alien 532 satisfies the trigger criteria associated with a sustained interaction in the game. The definition of a sustained interaction can change from game object to game object and be set up by the game developer or other party. Upon detecting the sustained action criteria is satisfied, the control focus (represented by the reticle 534) is locked on the first alien 532 and a secondary reticle 535 is displayed (see FIG. 7).

As long as the user actions continue to satisfy the sustained interaction criteria, then firing will continue. For example, the user may need to continue to hold the RT button and not move his character 510 out of range of the first alien 532 to continue meeting the sustained interaction criteria. Failing to continue to meet the sustained interaction criteria is one example of a termination criteria. Another termination criteria is the completion of the action, for example, the first alien 532 is destroyed or the gun runs out of ammunition, or the character 510 is killed, etc.

Figure 7:
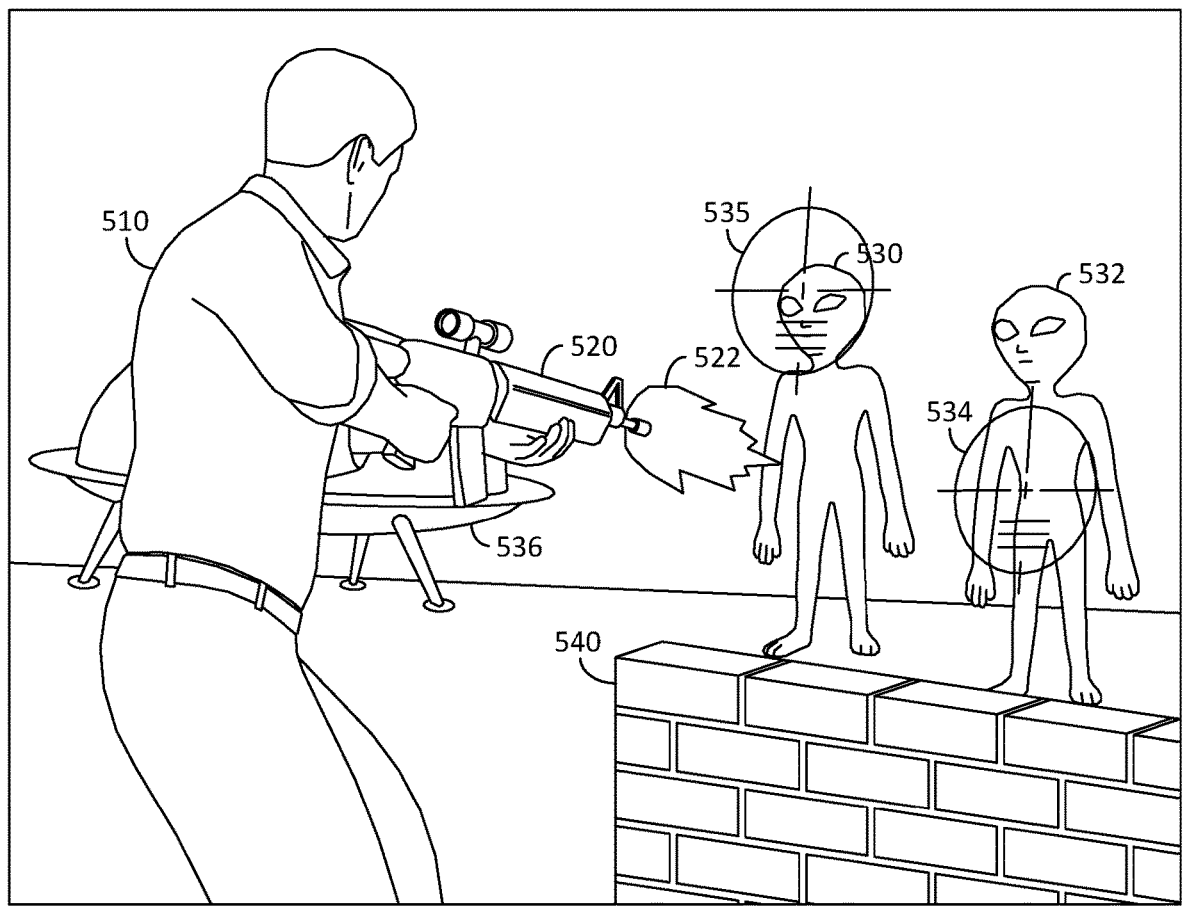
Figure 8:
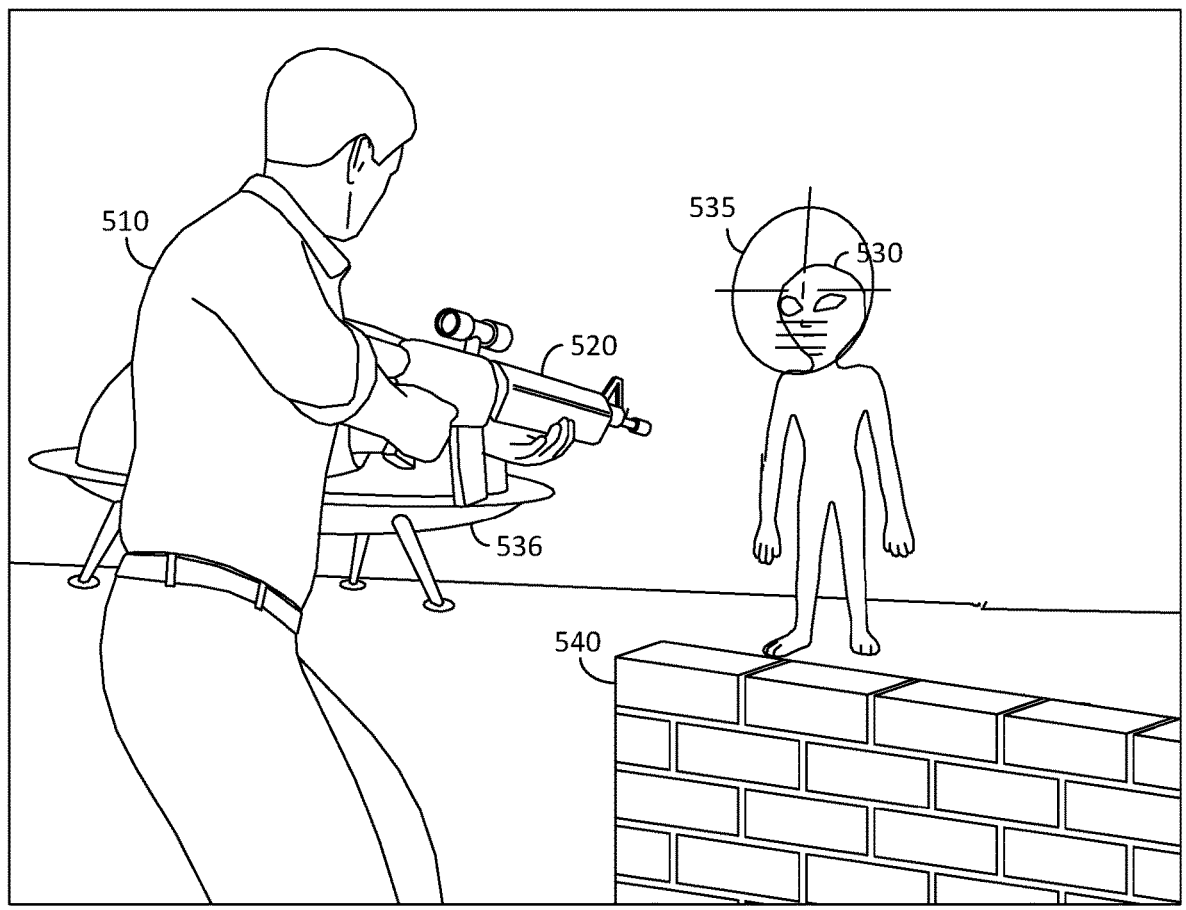

As shown in FIG. 7, the user can provide additional movement input to control the secondary reticle 535 to target the second alien 530. Upon detecting the termination of the sustained interaction, such as the first alien 532 dying, the reticle 534 snaps to the location of the secondary reticle 535. Effectively, the secondary reticle 535 becomes the primary reticle and only one reticle is visible, as shown in FIG. 8. The user could then target the second alien 530 or take some other action.

Figure 9:
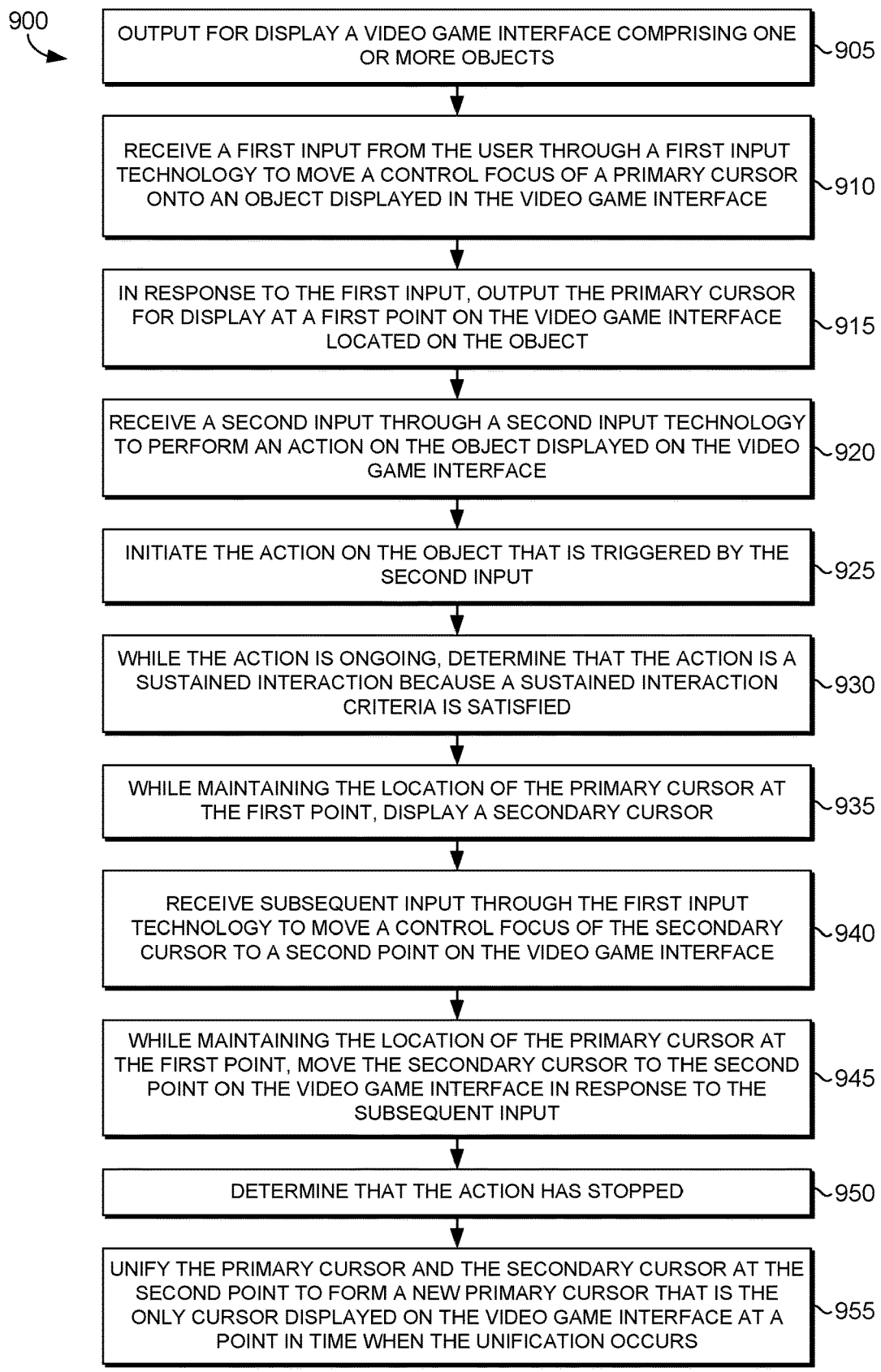
FIG. 9 is a flow chart showing a method of splitting the control focus of a user interface during a sustained user interaction, in accordance with aspects of the technology described herein.

Turning now to FIG. 9, a method 900 of splitting the control focus of a user interface during a sustained user interaction is shown, according to an aspect of the technology described herein. Method 900 could be performed by a computing device, such as a head-mounted display, smartphone, video game console, personal computer, or similar.

At step 905, a video game interface comprising one or more objects is output for display. The video game interface is generated by a computing device running software code for a video game. The interface may be output on a display integrated with the device generating the interface or it can be output to a peripheral device, such as an external monitor. Devices such as smartphones, tablets, laptops, and head-mounted computing devices have integrated displays. Output for display can mean that a rendered graphical image is communicated to display hardware, such as a screen. The communication can occur within a device having an integrated display. In other words, the interface can be output for display internally from the graphics pipeline of a device, for example, to its own display hardware. When communicated to an external display, the communication can be wired or wireless, including over a wide area network such as the Internet. For example, the video game interface could be generated by a server and communicated over a network to a computing device that displays the interface. In such a situation, a server is outputting the interface for display and the receiving device is actually displaying the interface.

The one or more objects can be game objects, such as animated game characters as described above with reference to the aliens or inanimate objects such as blocks, weapons, etc. An object can be any game feature on which an action can be performed by a user. Actions can comprise moving, picking up, breaking, targeting, shooting, or other actions. Game features that cannot be interacted with are not objects. For example, background scenery that cannot be adjusted or interacted with during game play may not be considered an object.

At step 910, a first input is received from the user through a first input technology to move a control focus of a primary cursor onto an object displayed in the video game interface. In one aspect, the first input technology is gaze detection. Gaze detection can be part of a head-mounted computing device, such as augmented reality glasses or a virtual reality headset. The control focus defines where on the interface an action would be directed if taken and is visibly indicated by the cursor location. For example, a cursor shows which object might be selected if the user clicked on a mouse button. A reticle might show where the user is targeting a weapon. A primary cursor is moved onto the object when the displayed cursor occludes the object, at least in part.

At step 915, in response to the first input, the primary cursor is output for display at a first point on the video game interface located on the object. In other words, the cursor moves in response to the user input, as is typically the case.

At step 920, a second input is received through a second input technology to perform an action on the object displayed on the video game interface. The second input is not the same as the first. For example, if the first input was through a joystick, then the second input was not through the same joystick. The first and second input technology can reside in the same hardware device. For example, the first input could be moving a mouse and the second pushing a mouse button. As another example, the first input could be moving a joystick on a gamepad and the second input is pushing a bumper on the gamepad or moving a different joystick on the same gamepad. The first and second input can be through separate hardware. For example, the first input could be moving a head-mounted display (e.g., gaze detection) and the second input could be a button on a gamepad.

At step 925, the action that is triggered by the second input is initiated on the object. As mentioned, different actions are applicable to different objects and games. The action needs to have control focus on the object as a criteria and then a second input for triggering. A given action could require other contextual or input criteria, such as a combination of button pushes, proximity of a character to an object, and such.

At step 930, while the action is ongoing, the action is determined to be a sustained interaction because a sustained interaction criteria is satisfied. A sustained user interaction is an interaction lasting more than a threshold period of time. The threshold period of time could be 100 ms, one second, two seconds, five seconds, ten seconds, or more. The interaction is determined to be a sustained interaction when criteria for a sustained interaction with the object is satisfied by the user input. The classification of an action as sustained can be based on an anticipated action duration. For example, if an action will take three seconds to complete, if it is completed, then initiation of the action can be enough to satisfy the trigger. Different objects can have different sustained interaction criteria. The sustained interaction is terminated when termination criteria is satisfied. Again, different objects can have different termination criteria.

At step 935, while maintaining the location of the primary cursor at the first point, a secondary cursor is output for display. The secondary cursor can have a different appearance from the primary cursor. For example, it could be a different color, size, texture, or similar. The secondary cursor can have the same movement responsiveness as the primary cursor. Meaning a similar input will result in a similar movement of the primary cursor or secondary cursor (when active).

At step 940, subsequent input is received through the first input technology to move a control focus of the secondary cursor to a second point on the video game interface. The subsequent input is through the same technology used to move the primary cursor.

At step 945, while maintaining the location of the primary cursor at the first point, the secondary cursor is moved to the second point on the video game interface in response to the subsequent input.

At step 950, the action is determined to have stopped. The sustained-action termination criteria can include completion of the action. Different actions have different completion scenarios, but in the block breaking scenario, completely breaking the block completes the action. The termination criteria can also include negation of one or more of the initiation criteria. For example, the user could discontinue activation of the input control responsible for the action. In other words, the user can release the "A" button that activated the action in the first place. The user could also navigate away from the object causing the action to cease.

At step 955, the primary cursor and the secondary cursor are unified at the second point to form a new primary cursor that is the only cursor displayed on the video game interface at a point in time when the unification occurs. Upon detection that a sustained-action termination criteria is satisfied, the primary and secondary cursor can be unified at the location of the secondary cursor when the termination criteria was satisfied. This can allow a user to quickly target an additional object as soon as the first sustained action is terminated.

Figure 10:
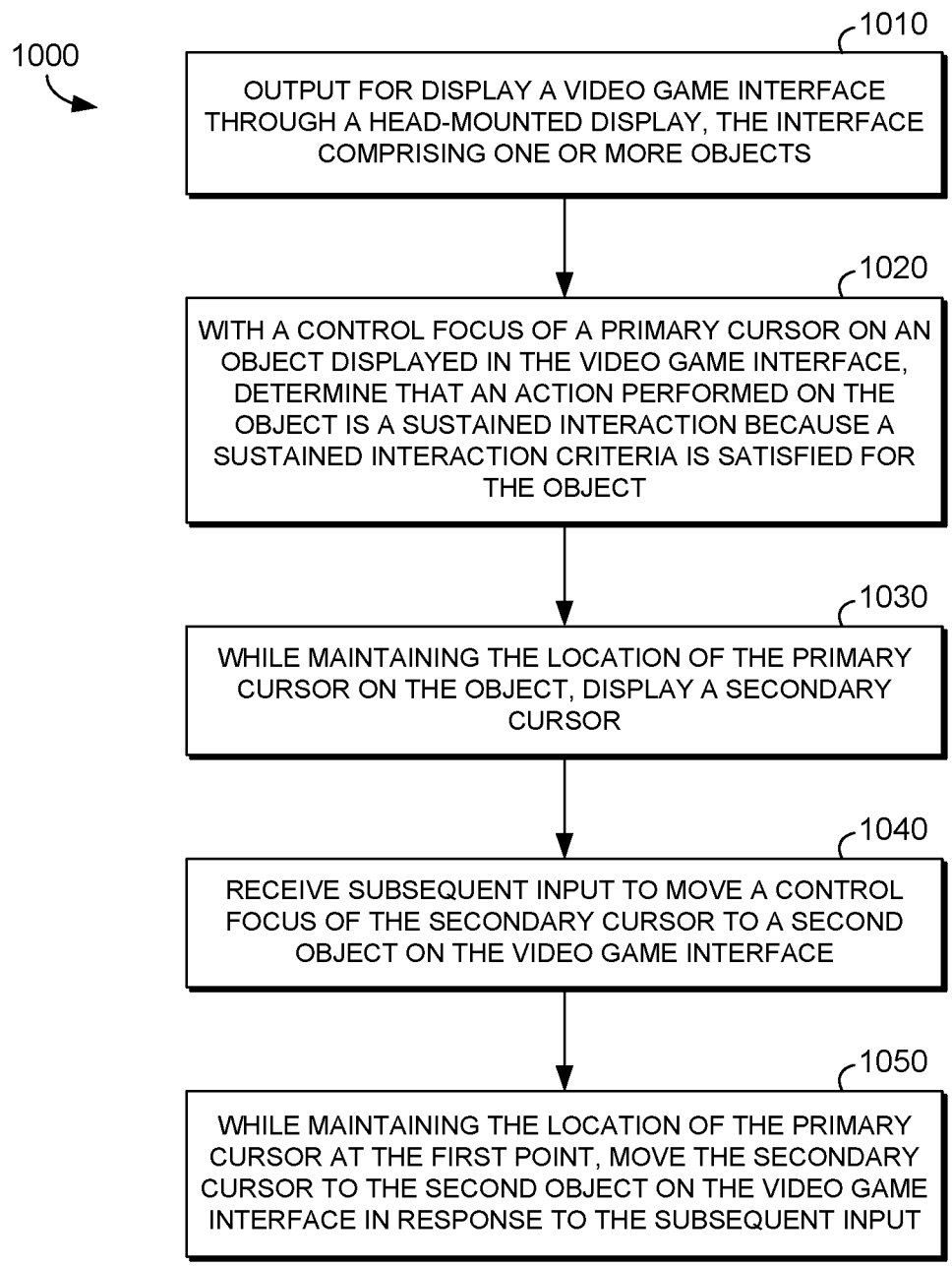
FIG. 10 is a flow chart showing a method of splitting the control focus of a user interface during a sustained user interaction, in accordance with aspects of the technology described herein.

Turning now to FIG. 10, a method 1000 of splitting the control focus of a user interface during a sustained user interaction is shown, according to an aspect of the technology described herein. Method 1000 could be performed by a computing device, such as a head-mounted display, smartphone, video game console, personal computer, or similar.

At step 1010, a video game interface is output for display through a head-mounted display, the interface comprising one or more objects. The video game interface is generated by a computing device running software code for a video game. The interface may be output on a display integrated with the device generating the interface or it can be output to a peripheral device, such as an external monitor. Devices such as smartphones, tablets, laptops and head-mounted computing devices have integrated displays. Output for display can mean that a rendered graphical image is communicated to display hardware, such as a screen. The communication can occur within a device having an integrated display. In other words, the interface can be output for display internally from the graphics pipeline of a device, for example, to its own display hardware. When communicated to an external display, the communication can be wired or wireless, including over a wide area network such as the Internet. For example, the video game interface could be generated by a server and communicated over a network to a computing device that displays the interface. In such a situation, a server is outputting the interface for display and the receiving device is actually displaying the interface.

The one or more objects can be game objects, such as animated game characters as described above with reference to the aliens or inanimate objects such as blocks, weapons, etc. An object can be any game feature on which an action can be performed by a user. Actions can comprise moving, picking up, breaking, targeting, shooting, or other actions. Game features that cannot be interacted with are not objects. For example, background scenery that cannot be adjusted or interacted with during game play may not be considered an object.

At step 1020, with a control focus of a primary cursor on an object displayed in the video game interface, an action performed on the object is determined to be a sustained interaction because a sustained interaction criteria is satisfied for the object. A sustained user interaction is an interaction lasting more than a threshold period of time. The threshold period of time could be 100 ms, one second, two seconds, five seconds, ten seconds, or more. The interaction is determined to be a sustained interaction when criteria for a sustained interaction with the object is satisfied by the user input. The classification of an action as sustained can be based on an anticipated action duration. For example, if an action will take three seconds to complete, if it is completed, then initiation of the action can be enough to satisfy the trigger. Different objects can have different sustained interaction criteria. The sustained interaction is terminated when termination criteria is satisfied. Again, different objects can have different termination criteria.

At step 1030, while maintaining the location of the primary cursor on the object, a secondary cursor is output for display on the video game interface.

At step 1040, subsequent input to move a control focus of the secondary cursor to a second object on the video game interface is received. The control focus defines where on the interface an action would be directed if taken and is visibly indicated by the cursor location. For example, a cursor shows which object might be selected if the user clicked on a mouse button. A reticle might show where the user is targeting a weapon. A primary cursor is moved onto the object when the displayed cursor occludes the object, at least in part.

At step 1050, while maintaining the location of the primary cursor at the first point, the secondary cursor is moved to the second object on the video game interface in response to the subsequent input. The secondary cursor can have a different appearance from the primary cursor. For example, it could be a different color, size, texture, or similar. The secondary cursor can have the same movement responsiveness as the primary cursor. Meaning a similar input will result in a similar movement of the primary cursor or secondary cursor (when active).

Figure 11:
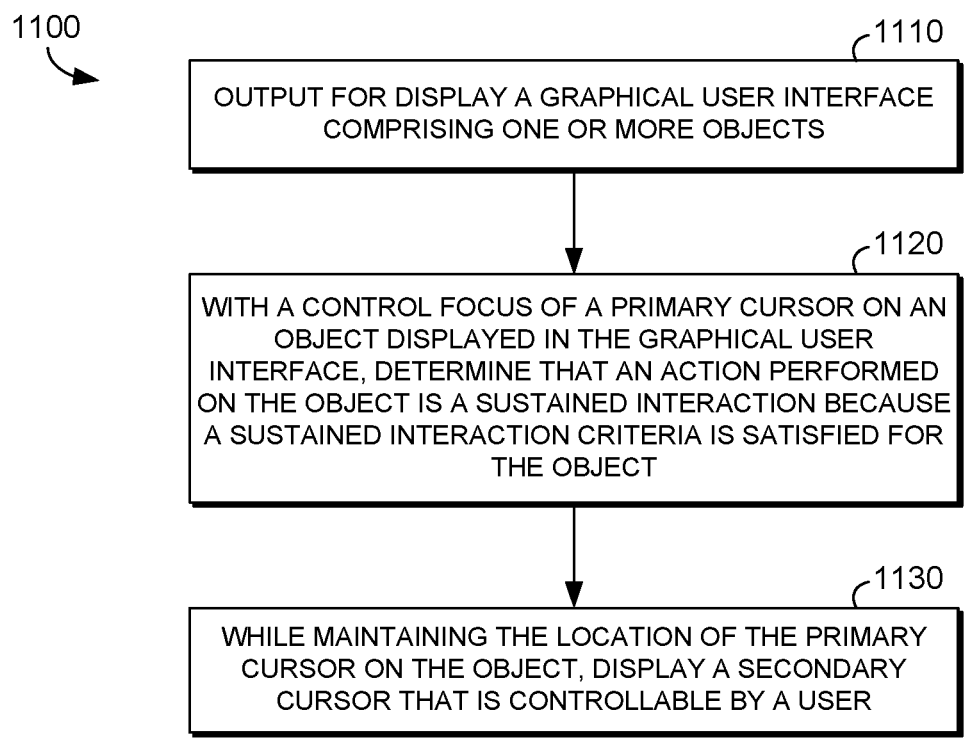
FIG. 11 is a flow chart showing a method of splitting the control focus of a user interface during a sustained user interaction, in accordance with aspects of the technology described herein.

Turning now to FIG. 11, a method 1100 of splitting the control focus of a user interface during a sustained user interaction is shown, according to an aspect of the technology described herein. Method 1100 could be performed by a computing device, such as a head-mounted display, smartphone, video game console, personal computer, or similar.

At step 1110, a graphical user interface comprising one or more objects is output for display. The graphical user interface is generated by a computing device running software code. The code can be for a video game or some other application, such as a training simulation, computer aided drafting, video editing, and such. The interface may be output on a display integrated with the device generating the interface or it can be output to a peripheral device, such as an external monitor. Devices such as smartphones, tablets, laptops and head-mounted computing devices have integrated displays. Output for display can mean that a rendered graphical image is communicated to display hardware, such as a screen. The communication can occur within a device having an integrated display. In other words, the interface can be output for display internally from the graphics pipeline of a device, for example, to its own display hardware. When communicated to an external display, the communication can be wired or wireless, including over a wide area network such as the Internet. For example, the video game interface could be generated by a server and communicated over a network to a computing device that displays the interface. In such a situation, a server is outputting the interface for display and the receiving device is actually displaying the interface. The graphical interface can be a virtual reality interface, an augmented reality interface, a 3D interface, and/or a 2D interface, such as the 2D interface on a TV.

The one or more objects can be game objects in the video game scenario, such as animated game characters as described above with reference to the aliens or inanimate objects such as blocks, weapons, etc. An object can be any game feature on which an action can be performed by a user. Actions can comprise moving, picking up, breaking, targeting, shooting, or other actions. Game features that cannot be interacted with are not objects. For example, background scenery that cannot be adjusted or interacted with during game play may not be considered an object.

At step 1120, with a control focus of a primary cursor on an object displayed in the graphical user interface, an action performed on the object is determined to be a sustained interaction because a sustained interaction criteria is satisfied for the object. A sustained user interaction is an interaction lasting more than a threshold period of time. The threshold period of time could be 100 ms, one second, two seconds, five seconds, ten seconds, or more. The interaction is determined to be a sustained interaction when criteria for a sustained interaction with the object is satisfied by the user input. The classification of an action as sustained can be based on an anticipated action duration. For example, if an action will take three seconds to complete, if it is completed, then initiation of the action can be enough to satisfy the trigger. Different objects can have different sustained interaction criteria. The sustained interaction is terminated when termination criteria is satisfied. Again, different objects can have different termination criteria.

At step 1130, while maintaining the location of the primary cursor on the object, a secondary cursor that is controllable by a user is output for display. The control focus defines where on the interface an action would be directed if taken and is visibly indicated by the cursor location. For example, a cursor shows which object might be selected if the user clicked on a mouse button. A reticle might show where the user is targeting a weapon. A primary cursor is moved onto the object when the displayed cursor occludes the object, at least in part. The secondary cursor can have a different appearance from the primary cursor. For example, it could be a different color, size, texture, or similar. The secondary cursor can have the same movement responsiveness as the primary cursor. Meaning a similar input will result in a similar movement of the primary cursor or secondary cursor (when active).

As used herein, the term "gaze direction" is a direction the AR/VR device is pointing towards when looked at from the perspective of the user. For example, if the AR/VR device is a headset worn by the user, the gaze direction is the direction the user's head (e.g., eyes) is looking towards. If the AR/VR device is a mobile device, such as a mobile phone, the gaze direction can be the direction of a camera opposite the display of the mobile device.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method of splitting a control focus of a user interface during a sustained user interaction, comprising:
outputting for display a video game interface comprising one or more objects;
receiving a first input from a user through a first input technology to move a control focus of a primary cursor onto an object displayed in the video game interface;
in response to the first input, outputting the primary cursor for display at a first point on the video game interface located on the object;
receiving a second input through a second input technology to perform an action on the object displayed on the video game interface;
initiating the action on the object that is triggered by the second input;
while the action is ongoing, determining that the action is a sustained interaction because a sustained action criteria is satisfied;
while maintaining the primary cursor at the first point, outputting for display a secondary cursor;
receiving a subsequent input through the first input technology to move a control focus of the secondary cursor to a second point on the video game interface;
while maintaining the primary cursor at the first point, moving the secondary cursor to the second point on the video game interface in response to the subsequent input;
determining that the action has stopped; and
unifying the primary cursor and the secondary cursor at the second point to form a new primary cursor that is an only cursor displayed on the video game interface at a point in time when unification occurs.

2. The method of claim 1, wherein the first input technology is gaze detection.

3. The method of claim 1, wherein a user is not able to initiate an action with a second object with the secondary cursor.

4. The method of claim 1, wherein the second input technology is a gamepad.

5. The method of claim 1, wherein the action stops when the object is destroyed.

6. The method of claim 1, wherein the video game interface is a virtual reality or augmented reality interface.

7. The method of claim 1, wherein the sustained action criteria is specific to the object.

8. A computer-readable storage media comprising computer-executable instructions that, when executed by a computer, performs a method of splitting a control focus of a user interface, the method comprising:
outputting for display a video game interface through a head-mounted display, the video game interface comprising one or more objects;
with a control focus of a primary cursor on an object displayed in the video game interface, determining that an action performed on the object is a sustained interaction because a sustained action criteria is satisfied for the object;
while maintaining the primary cursor on the object, outputting for display a secondary cursor;
receiving a subsequent input to move a control focus of the secondary cursor to a second object on the video game interface; and
while maintaining the primary cursor on the object, moving the secondary cursor to the second object on the video game interface in response to the subsequent input.

9. The media of claim 8, wherein the method further comprises:
determining that the action has stopped; and
unifying the primary cursor and the secondary cursor at the second object to form a new primary cursor that is an only cursor displayed on the video game interface at a point in time when unification occurs.

10. The media of claim 8, wherein the subsequent input is provided using gaze detection technology.

11. The media of claim 8, wherein a user is not able to initiate an interaction with the second object with the secondary cursor while the sustained interaction is ongoing.

12. The media of claim 8, wherein the action stops when a player controlled by a user moves away from the object before the object is destroyed.

13. The media of claim 8, wherein the action stops when the object is destroyed.

14. The media of claim 8, wherein the sustained action criteria is an action duration of more than a threshold period of time.

15. The media of claim 8, wherein the sustained action criteria is initiation of an action with an action completion time that is more than a threshold period of time.

16. A method of splitting a control focus of a user interface during a sustained user interaction, comprising:
outputting for display a graphical user interface comprising one or more objects;
with a control focus of a primary cursor on an object displayed in the graphical user interface, determining that an action performed on the object is a sustained interaction because a sustained action criteria is satisfied for the object, wherein the sustained action criteria is an action duration of more than a threshold period of time; and
while maintaining the primary cursor on the object, outputting for display a secondary cursor that is controllable by a user.

17. The method of claim 16, wherein the method further comprises:
receiving a subsequent input to move a control focus of the secondary cursor to a second object on the graphical user interface; and
while maintaining the primary cursor on the object, moving the secondary cursor to the second object on the graphical interface in response to the subsequent input.

18. The method of claim 16, wherein the sustained action criteria includes initiation of an action with an action completion time that is more than a threshold period of time.

19. The method of claim 16, wherein the user is not able to initiate an interaction with a second object with the secondary cursor while the sustained interaction is ongoing.

20. The method of claim 16, wherein the method further comprises:
   determining that the action has stopped; and
   unifying the primary cursor and the secondary cursor to form a new primary cursor.

\* \* \* \* \*